Oct. 1, 1957      O. J. AIKEN      2,808,175
POT LID HANDLE AND HOLDER

Filed June 8, 1955      2 Sheets-Sheet 1

Ormarion J. Aiken
INVENTOR.

BY *Clarence A. O'Brien*
*and Harvey B. Jacobson*
Attorneys

Oct. 1, 1957  O. J. AIKEN  2,808,175
POT LID HANDLE AND HOLDER
Filed June 8, 1955  2 Sheets-Sheet 2

Ormarion J. Aiken
INVENTOR.

United States Patent Office 2,808,175
Patented Oct. 1, 1957

2,808,175

POT LID HANDLE AND HOLDER

Ormarion J. Aiken, Walkerville, Mich.

Application June 8, 1955, Serial No. 514,002

1 Claim. (Cl. 220—85)

This invention relates generally to cooking utensils and more particularly concerned with a pot lid handle and holder means whereby the pot lid may be removed from a pot and retained in a substantially vertical position with an edge portion positioned within the pot.

A further object of invention in conformance with that set forth above is to provide a pot lid handle and holder which includes resilient leg members which may include free end portions extending beyond the edge of the pot lid which are clampingly engageable on opposite pot wall portions, and including means on said clamp member engageable with a top edge portion of the pot wall for positioning the pot lid in a substantially vertical position thereon with the edge of the pot lid in contact with the upper edge of the pot.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
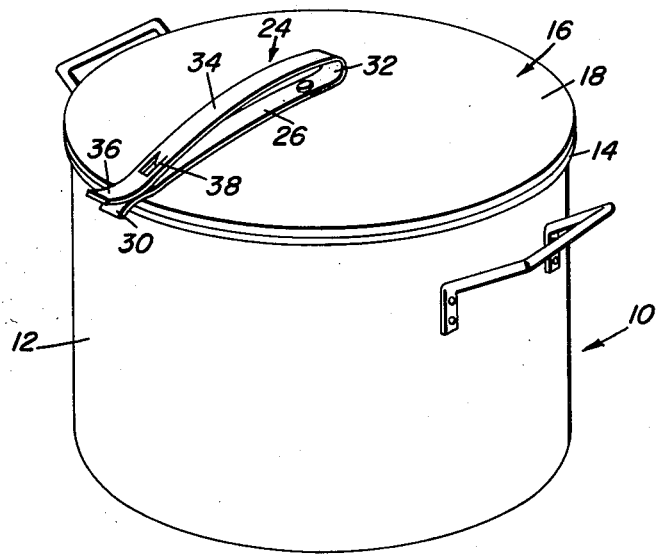
Figure 1 is a perspective view of the novel pot lid handle and holder of a pot lid with the pot lid in position on a pot.
Figure 3:
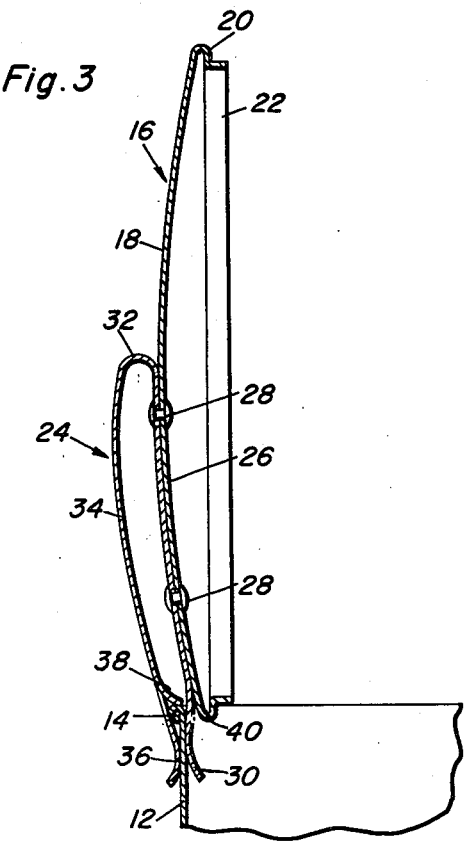
Figure 3 is an enlarged fragmentary sectional view taken substantially on line 3—3 of Figure 2.
Figure 2:
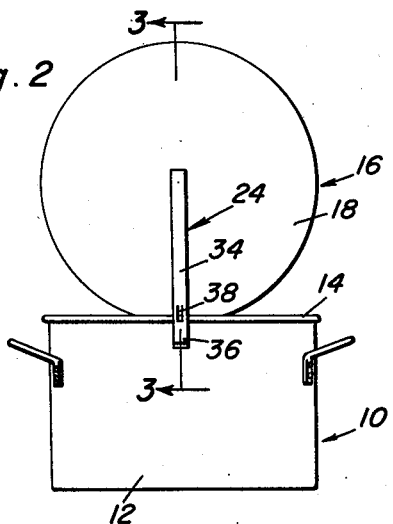
Figure 2 is an elevational view on a reduced scale showing the pot lid in its substantially vertically supported position on the edge of a pot wall.

Considering Figures 1 through 3, there is disclosed a pot indicated generally at 10 which includes usually vertically extending side wall portions 12 terminating in a top rolled or beaded edge 14. The pot lid is indicated generally at 16 and includes a top portion terminating in lower surface portion 20 engageable in overlying relation to the portion of the pot and terminating in a downwardly extending annular flange portion 22 extendable within the pot. The just described structure is conventional and a specific description of the novel pot lid handle and holder structure will be subsequently described. It is to be kept in mind that a constant source of irritation when cooking, etc., is to support the pot lid relative to the pot so that any water vapor which has accumulated within the pot lid will drain back into the pot. Such a position of drainage is illustrated in Figures 2 and 3. Furthermore, in order to facilitate working in the kitchen if the pot lid is supported on the upper edge of the pot it will be out of the way of the cook or housewife thus reducing a source of aggravation and making for more efficient procedure in the kitchen.

The pot lid handle and holder is indicated generally at 24 and includes a lower leg portion 26 secured in juxtaposition at intermediate portions thereof and the upper surface of the pot lid by means of securing rivets 28, for example, the lower leg includes an arcuate free end portion 30 which is engageable on an inner pot wall portion, see Figure 3. The leg 26 terminates in a bight portion 32 which continues as an upper arcuate leg portion 34 which overlies the lower leg portion 26, said upper leg terminating in a lower arcuate free end portion 36 which diverges relative to the free end portion 30 of the lower leg 26, the upper leg portion 34 providing a handle means for removing the pot lid from the position shown in Figure 1 and placing it on the pot wall as seen in Figures 2 and 3. The upper leg 36 includes a struck-out lug or stop element 38 which extends from the upper leg toward the lower leg as seen in Figure 3, and which is engageable with the bead portion 14 of the pot positioning the pot lid in a substantially vertical position on the pot wall. The free end portions 30 and 36 of the pot lid handle and holder 24 may extend beyond the edge 40 of the pot lid, and by virtue of their diverging relationship are readily insertable over the bead 14 of the pot wall 12, and the upper lower leg members 26 and 34 are constructed of a resilient spring material whereby said legs are resiliently urged toward each other.

Figure 4:
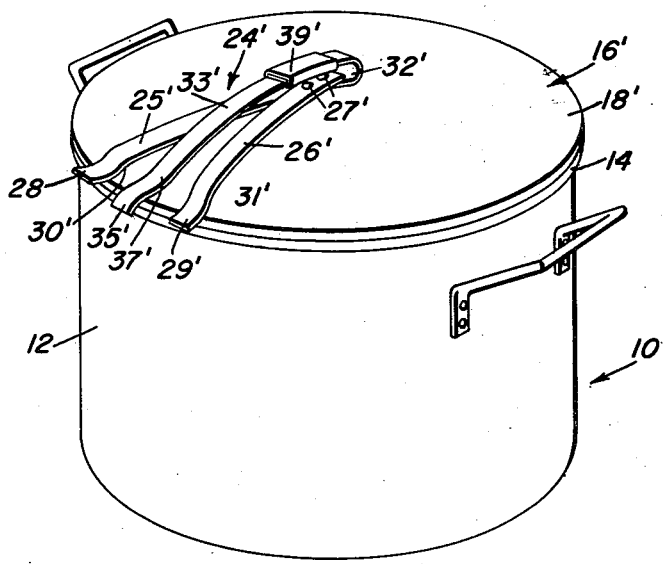
Figure 4 is a perspective view on another embodiment of the pot lid handle and holder.
Figure 5:
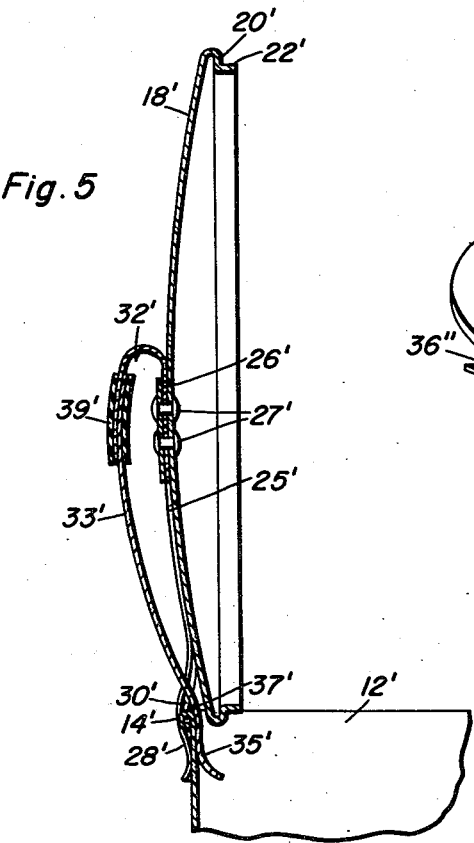
Figure 5 is an enlarged fragmentary sectional view similar to Figure 3 of the embodiment of invention in Figure 4.

In the embodiment of Figures 4 and 5, there is disclosed a pot generally indicated at 10 which includes the side walls 12 and the bead or rolled edge portion 14. The pot lid is indicated at 16' and includes the dome top portion 18', a lower surface portion 20' engageable in overlying relationship on the bead portion 14, and a downwardly annular flange portion 22' which extends within the pot.

The pot lid handle and holder indicated at 24' includes a pair of lower leg members 25' and 26' which are angularly related to each other, the leg member 26' being secured to the leg member 25' by means of suitable fastening rivets 27', for example.

The leg members 25' and 26' each include an upwardly extending free end portion 28' and 29', respectively, and downwardly facing concave portions 30', and 31', respectively. The leg member 25' includes an upper bight portion 32' which continues as an overlying arcuate leg portion 33' which extends in overlying relationship between the leg members 25' and 26', and includes a downwardly extending free end portion 35' and an intermediate upwardly facing concave portion 37'.

The rivet 27' may not only secure the leg member 26' to the leg member 25' but also extend through the top portion 18' for the securement of the lid handle and holder thereto.

A suitable non-heat conducting material such as hard rubber, plastic, etc., may be concentrically disposed about the upper leg member 33' as seen at 39'.

As most clearly seen in Figure 5, the concave portions 30' and 31' of the leg members 25' and 26', respectively, will be disposed adjacent the outside of the bead 14' of the pot wall 12' with the free end portions thereof in engagement with the outside of the pot wall, and the upper leg 33' will have its concave portion 37' bent in between the lower leg members in engagement on the inside of the bead portion 14' of the pot wall, the free end portion 35' thereof will be in engagement with the inside of the pot wall between the place of engagement of the free ends of the lower leg members.

Figure 6:
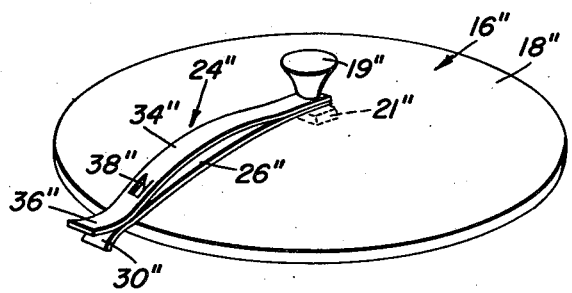
Figure 6 is a still further embodiment of the invention illustrating a pot lid handle and holder to be incorporated on a conventional pot.

In the embodiment of Figure 6 there is disclosed a pot lid 16" which includes the cover portion 18", there being secured centrally thereto an enlarged handle element 19"

which is secured thereon by means of a nut element 21" in the conventional manner. The handle and holder is indicated at 24" and includes a lower leg member 26" which includes a free end portion 30" of the same configuration as that of the embodiment of Figures 1 through 3. The upper leg member is indicated at 34" and includes a free end portion 36" the same as the previously mentioned embodiment. The upper leg member further includes a struck-out downwardly extending stop or lug element 38" the same as that shown in Figure 1. Instead of the leg members 26" and 34" being secured by means of a bight portion, they include on the rear end thereof apertured portions (not shown) through which a threaded fastening element on the handle 19" extends, and accordingly the handle and holder 24" may be suitably secured on the pot lid 16".

Although the pot lid holder is described as being used with cooking utensils, it is to be understood that it may be also used on the lid of paint cans, garbage cans, etc.

Various positional directional terms such as "top," "bottom," "side" are utilized herein to have only a relative connotation to aid in describing the device, and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A holder for a dome top pot lid comprising a terminal bight portion forming a return bent loop, at least a pair of resilient lower and upper leg members having corresponding ends connected together by said bight portion in overlapping relation, said members having free arcuate ends relatively flaring for straddling and gripping a pot wall adjacent opposite sides of an upper edge of a pot to retain said holder in an upright position, said lower member being curved in a long arc to fit flatly on top of a dome top pot lid to be secured thereto, said upper leg member overlying said lower leg member and being bowed longitudinally away from said lower leg member in a shorter arc to space said upper leg member from said lower leg member and forming an elongated handle on said holder, and means for attaching said lower leg member to a dome top pot lid, another lower leg member having one end connected to the connected ends of the first named leg members and also having a free arcuate end for gripping a pot wall, said lower leg members diverging relatively and from opposite sides of the upper leg member, the upper leg member being bent between and crosswise of the lower leg members whereby said lower leg members are adapted to grip a pot wall at one side of said edge and the upper leg member is adapted to grip a pot wall at the opposite side of said edge.

References Cited in the file of this patent

UNITED STATES PATENTS

| | | |
|---|---|---|
| 498,020 | Murray | May 23, 1893 |

FOREIGN PATENTS

| | | |
|---|---|---|
| 660,425 | Great Britain | Nov. 7, 1951 |
| 169,608 | Austria | Dec. 10, 1951 |